United States Patent

Mitterlehner

(10) Patent No.: US 9,625,113 B2
(45) Date of Patent: Apr. 18, 2017

(54) VEHICLE HEADLIGHT

(71) Applicant: ZIZALA LICHTSYSTEME GMBH, Wieselburg (AT)

(72) Inventor: Thomas Mitterlehner, Mank (AT)

(73) Assignee: ZKW GROUP GMBH, Wieselburg an der Erlauf (AT)

(*) Notice: Subject to any disclaimer, the term of this patent is extended or adjusted under 35 U.S.C. 154(b) by 0 days.

(21) Appl. No.: 14/901,319

(22) PCT Filed: May 22, 2014

(86) PCT No.: PCT/AT2014/050122
§ 371 (c)(1),
(2) Date: Dec. 28, 2015

(87) PCT Pub. No.: WO2015/000006
PCT Pub. Date: Jan. 8, 2015

(65) Prior Publication Data
US 2016/0153632 A1 Jun. 2, 2016

(30) Foreign Application Priority Data

Jul. 4, 2013 (AT) .............................. A 50438/2013

(51) Int. Cl.
*F21S 8/10* (2006.01)
*G02B 26/12* (2006.01)
(Continued)

(52) U.S. Cl.
CPC ........... *F21S 48/1145* (2013.01); *B60Q 11/00* (2013.01); *F21S 48/1258* (2013.01);
(Continued)

(58) Field of Classification Search
CPC .............. F21S 48/1145; F21S 48/1258; G02B 26/0833; G02B 26/127; B60Q 11/00
(Continued)

(56) References Cited

U.S. PATENT DOCUMENTS 4,852,956 A * 8/1989 Kramer .............. G06K 15/1285
359/17
7,433,109 B2 * 10/2008 Yamagata .......... G02B 13/0005
359/205.1
(Continued)

FOREIGN PATENT DOCUMENTS

EP 2490063 A1 8/2012
EP 255154 A1 1/2013
(Continued)

OTHER PUBLICATIONS

First Office Action of Austrian Patent Application No. A 50438/2013 dated Apr. 7, 2014.
(Continued)

*Primary Examiner* — Seung C Sohn
(74) *Attorney, Agent, or Firm* — Evershades Sutherland (US) LLP

(57) ABSTRACT

A vehicle headlight having at least one laser light source (2), of which the laser beam (3) is deflected onto a lighting surface (6) having a light-conversion phosphor via a micromirror (1) that can be pivoted about at least one axis in order to generate a light image on said lighting surface in a scanning manner, which light image can be projected onto a roadway via an optics unit (7). In this headlight at least one photosensor (9) is positioned with respect to the lighting surface (6) having the light-conversion phosphor such that the photosensor detects a secondary laser beam (8) emitted from the lighting surface in predetermined deflection positions of the micromirror (1) and is designed to emit a signal (s).

5 Claims, 4 Drawing Sheets

Figure 1:
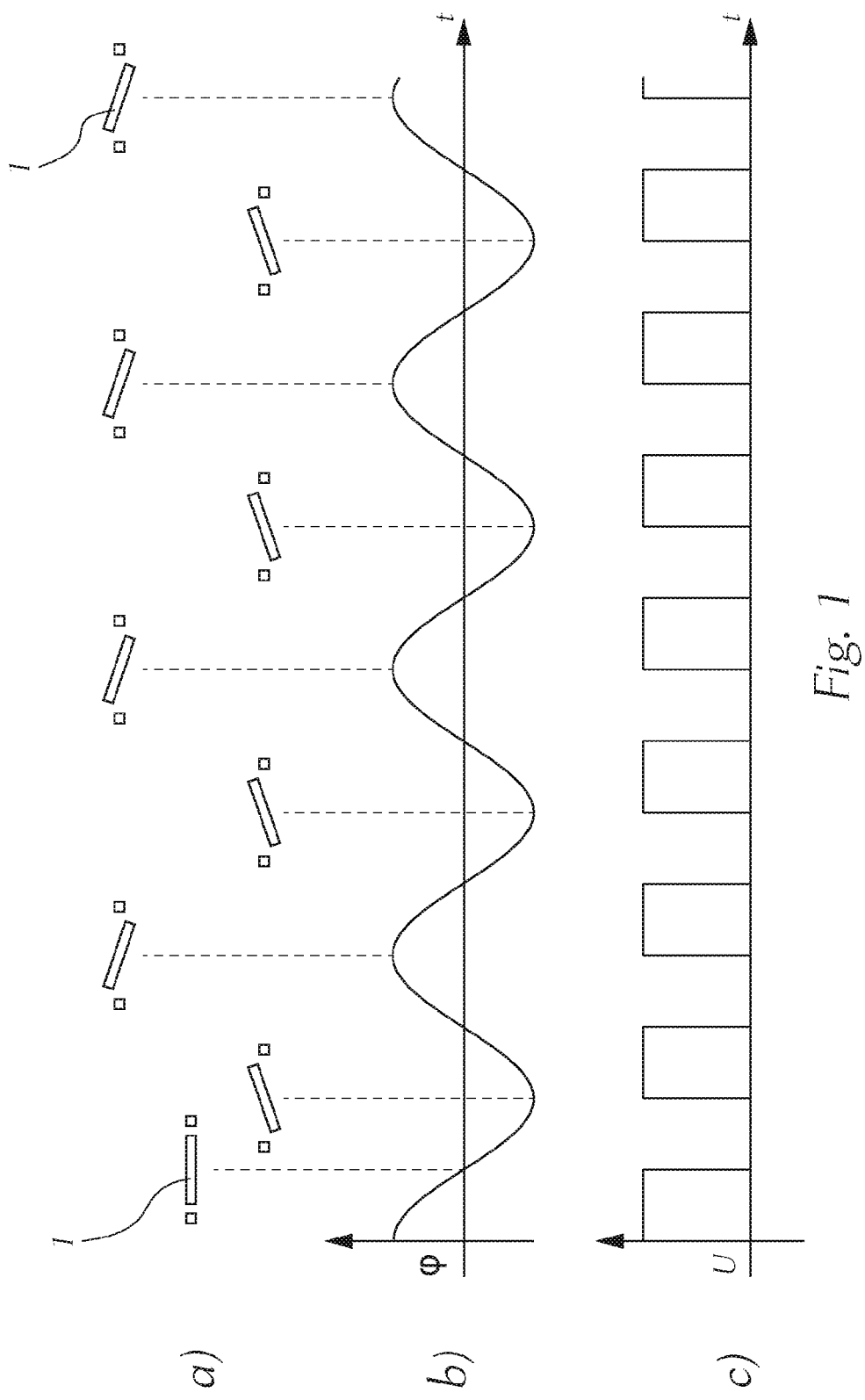

(51) Int. Cl.
*B60Q 11/00* (2006.01)
*G02B 26/08* (2006.01)
*G02B 26/10* (2006.01)
*B60Q 1/00* (2006.01)

(52) U.S. Cl.
CPC ....... *F21S 48/1747* (2013.01); *F21S 48/1757* (2013.01); *G02B 26/105* (2013.01); *G02B 26/127* (2013.01); *B60Q 1/0023* (2013.01); *G02B 26/0833* (2013.01); *G02B 26/101* (2013.01)

(58) Field of Classification Search
USPC .................................................... 250/214 R
See application file for complete search history.

(56) References Cited

U.S. PATENT DOCUMENTS

2003/0021497 A1   1/2003   Kandori
2011/0063115 A1   3/2011   Kishimoto
2011/0249460 A1   10/2011  Kushimoto

FOREIGN PATENT DOCUMENTS

| EP | 2767751 A1 | 8/2014 |
| EP | 2821692 A1 | 1/2015 |
| WO | 2005106562 A1 | 11/2005 |
| WO | 2011141377 A1 | 11/2011 |
| WO | 2013001953 A1 | 1/2013 |

OTHER PUBLICATIONS

International Search Report for PCT/AT2014/050122 dated Nov. 7, 2014.

IPRP for PCT/AT2014/050122 dated Sep. 30, 2015.

\* cited by examiner

VEHICLE HEADLIGHT

The invention relates to a vehicle headlight having at least one laser light source, of which the laser beam is deflected onto a lighting surface having a light-conversion phosphor via a micromirror that can be pivoted about at least one axis in order to generate a light image on said lighting surface in a scanning manner, which light image can be projected onto a roadway via an optics unit.

In the case of headlights of this type, for example see WO 2011/141 377A1, a blue laser light for example is converted into "white" at the lighting surface having the conversion phosphor. The term "phosphor" used here is not to be understood in the chemical sense, but is to include substances that can convert light of one wavelength or spectral distribution into light of another wavelength or spectral distribution, for example which can even convert blue or ultraviolet laser light into a light mixture suitable for a headlight, especially into a light that is perceived approximately as "white" by the human eye. With appropriate control of the laser light source and the micromirror, a light distribution corresponding to a light image generated on the lighting surface can be projected onto the roadway via an optics unit and can be adapted dynamically to the roadway situation, the driving speed and other specifications.

Micromirrors are set in motion via actuators, which for example operate on an electrostatic or piezoelectric basis. The frequency of the control signals is often selected such that it is close to the mechanical resonance frequency of the vibrating micromirror so as to thus minimise damping. It is also necessary however for purely technical but also safety reasons to have constant information regarding the mirror movement and/or the mirror position. Sensors are therefore often contained in micromirror units and deliver corresponding signals, wherein capacitive or inductive transmitters can be used by way of example.

WO 2005 106562 A1 discloses a laser-projection system in which a modulated projection light bundle is generated by a micromirror and exits outwardly through a projection opening in a housing in order to project an image. In order to check whether the micromirror is vibrating or in order to obtain a synchronisation signal in the event that the mirror is vibrating, photosensors are mounted at the edges of the projection opening and emit a signal with impingement of the laser beam. The problem associated with a lighting surface having a conversion phosphor naturally cannot be deduced from this document.

EP 2 490 063A1 discloses a micromirror apparatus which is mounted about at least one axis and which serves to deflect a laser beam. In order to be able to measure the rotary position of the mirror, an independent light source, for example an LED, is provided, which throws a light beam onto the rear side of the micromirror via a semi-permeable mirror and a projection system, which light beam is reflected from there, passes through the semi-permeable deflection mirror and impinges on a photodetector in order to generate a signal. The structure of this apparatus is extremely complex and requires a large amount of space on account of the additional light source, the projection system therefore, and the deflection mirror. In addition, it is necessary to be able to form an opening in the substrate of the micromirror arrangement so that the micromirror can also be optically detected on the rear side thereof.

In the case of the headlights according to the prior art the position of the micromirror and movement thereof can indeed be determined, however the sensor detecting the mirror position/movement does not deliver any information as to whether the laser beam correctly impinges on the lighting surface having the phosphor. Since the light images formed by the vehicle headlights also have to comply with legal requirements and limits, it should also be possible to test these using simple methods.

On account of the application in headlights, large temperature differences also, have to be managed and may lead to a phase shift between control signal and vibration profile of the micromirror. Consequently, the micromirror is no longer deflected correctly, thus resulting in a defective light image.

The object of the invention is to create a headlight that is not reliant on sensors integrated in micromirror units and with which information regarding the micromirror position/movement can be obtained economically.

This object is achieved with a headlight of the type mentioned in the introduction, with which, in accordance with the invention, at least one photosensor is positioned with respect to the lighting surface having the light-conversion phosphor such that the photosensor detects a secondary laser beam emitted from the lighting surface in predetermined deflection positions of the micromirror and is designed to emit a signal.

Thanks to the invention not only is information concerning the movement of the micromirror obtained in a simple manner, but it is also possible to draw conclusions from the obtained signals with regard to the intactness of the phosphor-conversion layer or with regard to an impingement of the laser beam on the phosphor.

In accordance with an advantageous embodiment of the invention the secondary beam emitted from the lighting surface is a reflected part of the primary laser beam. This embodiment utilises the fact that part of the impinging laser beam, albeit only a small part, is reflected at the phosphor-conversion layer or is at least diffusely reflected.

In accordance with another variant the secondary laser beam emitted from the lighting surface is part of the primary laser beam penetrating the lighting surface. Here it is possible to utilise the phenomenon that in many cases, although not desired a priori, a small part of the laser beam passes through the phosphor layer and exits at least diffusely on the other side of the phosphor layer.

Should the micromirror be pivotable about two axes and should each of the two pivot ranges corresponding to the two axes be assigned at least one photosensor, the necessary information regarding the mirror position and/or movement is also obtained with a two-dimensionally scanning laser beam.

The fact that at least one photosensor is provided for each of the reflected secondary laser beam and the secondary laser beam penetrating the lighting surface, a higher level of security with respect to the relevance of the obtained signals is obtained, or additional assertions can be made regarding the intactness of the lighting surface.

Figure 3:
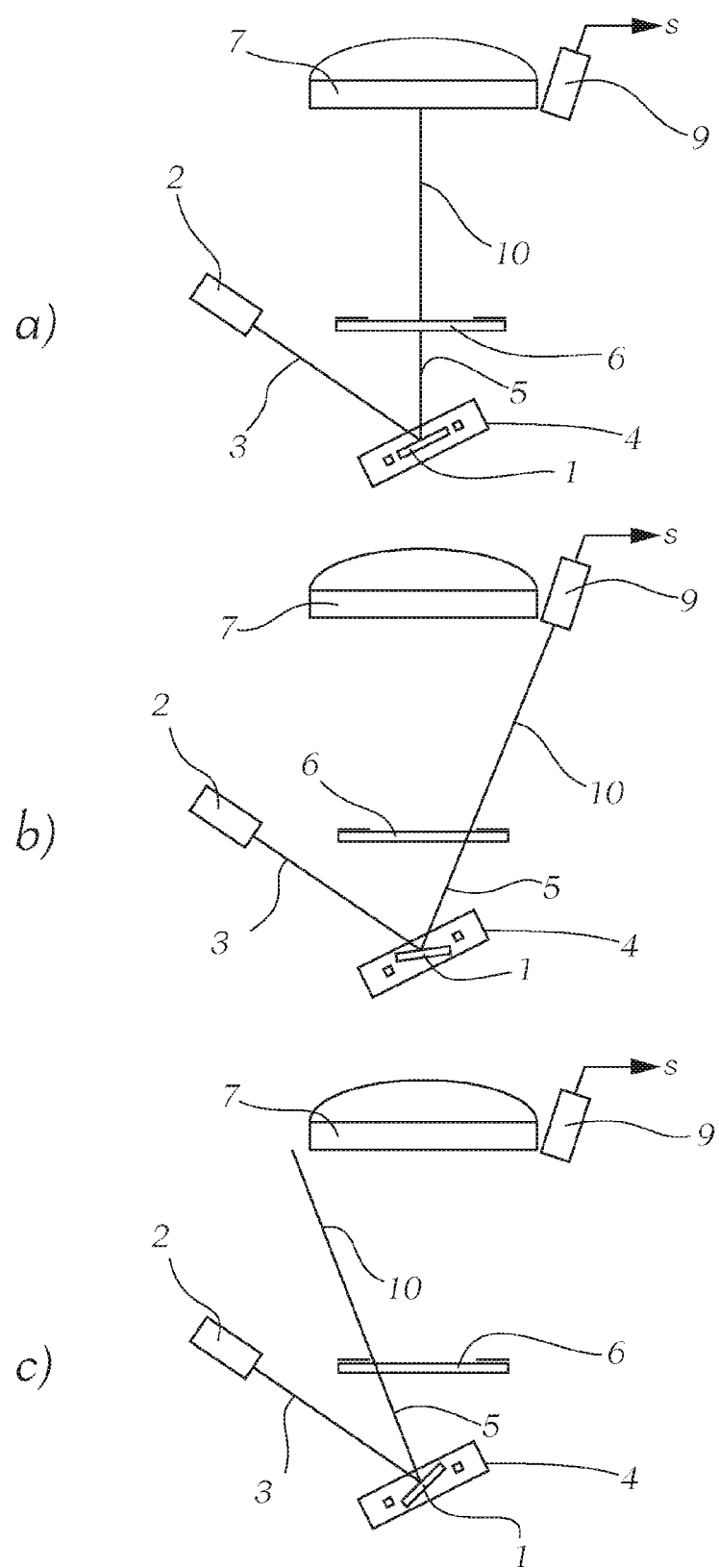
Figure 4:
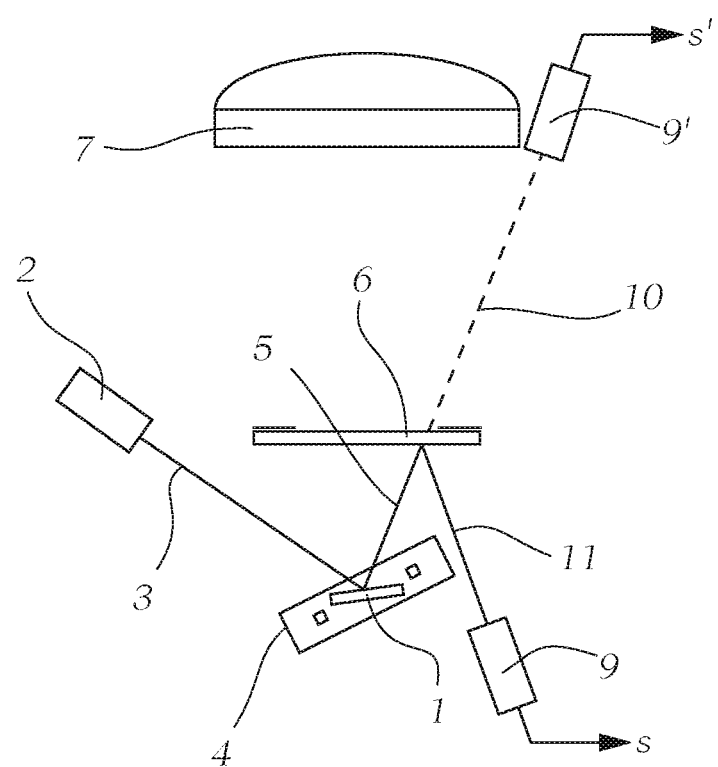

The invention together with further advantages is explained in greater detail hereinafter on the basis of exemplary embodiments illustrated in the drawing, in which FIG. 1 schematically shows various deflection positions of a micromirror, the profile of the deflection angle, and the exemplary profile of a control voltage of the micromirror actuator, FIGS. 2a to 2c show a first embodiment of a headlight according to the invention, in which a part of a laser beam reflected by the front side of the lighting surface having a light-conversion phosphor is used, FIGS. 3a to 3c show a second embodiment of a headlight according to the invention, in which a part of a laser beam passing through the lighting surface having a light-conversion phosphor is used, and FIG. 4 shows a third embodiment of a headlight according to the invention, in which a part of a laser beam reflected by the rear side of the lighting surface having a light-conversion phosphor is used.

For improved understanding of the problems addressed by the invention, the behaviour of the deflection of a micromirror depending on the control voltage thereof will first be explained on the basis of FIG. 1a to 1c. A micromirror 1 is illustrated to the far left in FIG. 1a in its neutral position, parallel to a substrate (not shown). Along the time axis t, the mirror 1 assumes different pivot positions, which each correspond to a deflection angle φ (FIG. 1b) of which the profile over time is substantially sinusoidal. FIG. 1c shows the profile (here rectangular) of a control voltage U of the mirror actuator (likewise not shown).

When the micromirror 1 is excited so as to vibrate, it is not possible to predict the direction in which it will vibrate first. Therefore, this direction must be determined via a sensor so that a synchronisation with the control of the laser can be performed.

The voltage U is switched on in each extreme position and is switched off at each zero crossing (corresponding to the neutral position). In this example this results in a doubled control frequency for the vibration frequency of the mirror. Since, during the process in which the micromirror vibrates transiently, it is not possible to ensure or predict the direction in which the micromirror will start to vibrate, this must be determined by a sensor.

Reference will now be made to FIGS. 2a to 2c. These figures show in a highly simplified manner a headlight according to the invention comprising a laser 2, which emits a modulated laser beam 3, wherein this beam 3 impinges on a micromirror 1 of a microscanner 4 and, deflected thereby as reflected, primary laser beam 5, impinges on a lighting surface 6 having a light-conversion phosphor.

The microscanner 4 is usually formed as a MOEMS (micro optical electro mechanical system) and here for the sake of simplicity is shown as vibrating about just a single axis. As already mentioned, however, it is possible to also use a micromirror 1 vibrating about two axes.

The light of the reflected primary laser beam 5, for example blue light having a wavelength in the range from approximately 450 to 490 nm, is converted by the phosphor of the lighting surface 6 into a light that is suitable for a headlight and that is as white as possible, wherein the scanning laser beam 5 generates a light image on the lighting surface 6 which is projected onto the roadway by means of an optics unit 7, for example a lens.

The invention utilises the fact that the entire primary laser beam 5 is not usually absorbed in the phosphor of the lighting surface 6 and converted into light of another wavelength, but that part of the laser beam also exits as secondary laser beam 8 reflected by the lighting surface.

The headlight has a photosensor 9, which is arranged such that, in a certain deflection position of the micromirror 1, it can detect the reflected secondary laser beam 8 exiting from the lighting surface 6 and can emit an electrical signal s accordingly. In FIG. 2a the micromirror 1 is in its neutral position and the corresponding beam profile does not cause the secondary laser beam 8 reflected by the lighting surface 6 to be detected by the photosensor 9.

As the mirror 1 is pivoted from the neutral position shown in FIG. 2a into a first extreme position, the deflected primary laser beam 5 exiting from the micromirror 1 is guided after partial reflection on the lighting surface 6 to a secondary laser beam 8, which impinges on the photosensor 9 and generates a signal accordingly, which for example can be used for synchronisation of the laser control.

FIG. 2c shows the other extreme position of the micromirror 1, in which the partially reflected secondary laser beam 8 is even further removed from the photosensor 9 than in the neutral position of the mirror 1 in FIG. 2a.

It can be seen that each time the photosensor 9 passes through a light image at a certain position, the presence, i.e. impingement, of the primary laser beam 5 is detected. Since it is known that the primary laser beam 5 must impinge on a certain point of the lighting surface 6 at a certain moment in time, all other points can also be calculated from the signal s emitted by the photosensor 9. Should the laser beam be located at the anticipated moment in time at the anticipated location, the system is in order and it is not necessary to interfere in any way with the function of the headlight.

On the other hand, malfunctions are identified when there is no signal s of the photosensor 9 at the anticipated moment in time. It may be that either the laser 2 has failed, the micromirror is not moving, for example has become stuck, or that a phosphor layer has detached from the lighting surface 6. These states lead either to no signal or to a weak or otherwise distorted signal.

The invention is of course not limited to the presence of a single photosensor 9. Rather, a second photosensor for example could be provided, which detects the reflected secondary laser beam 8 in the second extreme position of the micromirror 1 (FIG. 2c).

Figure 2:
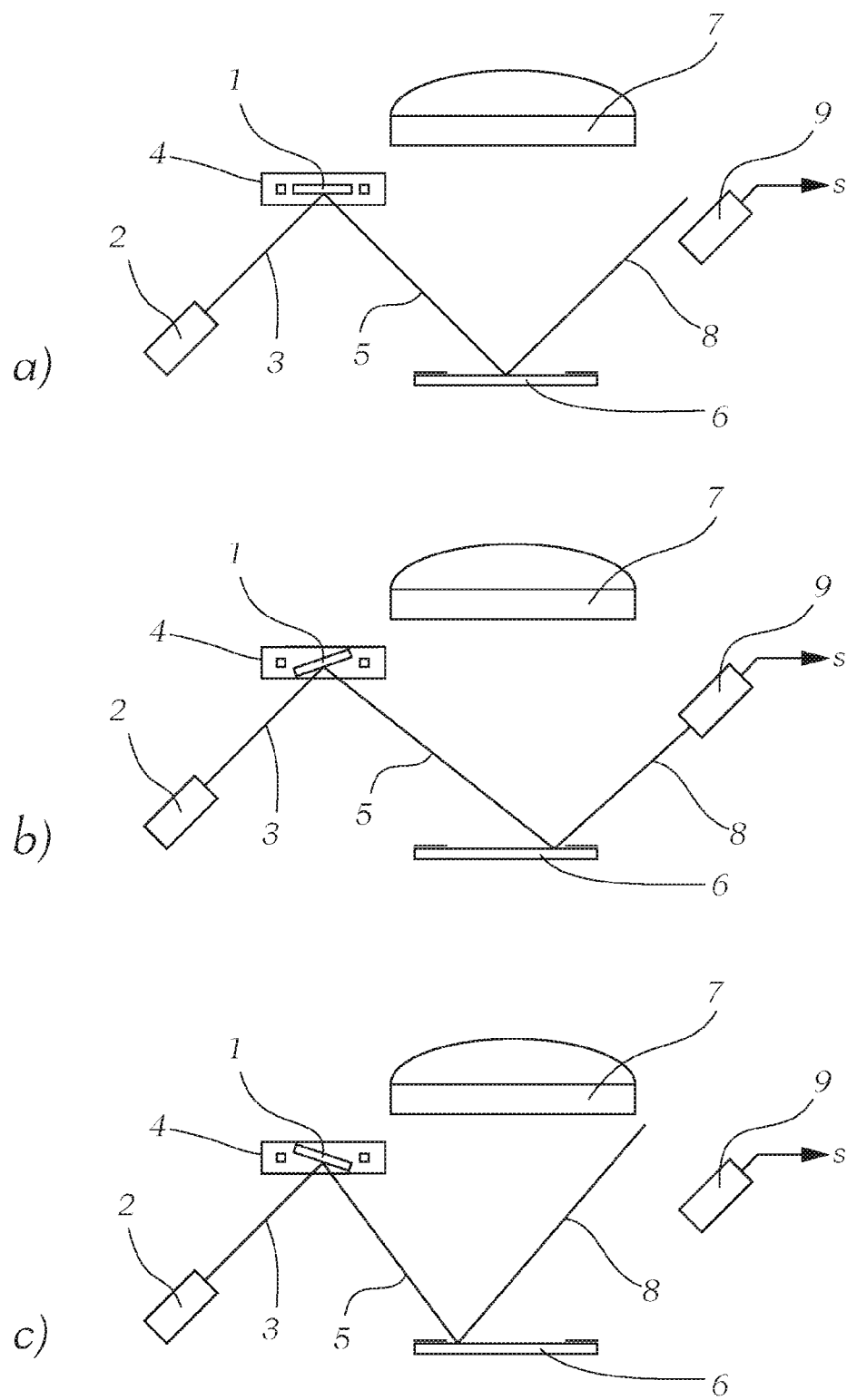

Another embodiment of the invention is illustrated in FIG. 3a-c, wherein the same reference signs as used in FIG. 2 are used for comparable parts. In this embodiment the modulated laser beam 3 likewise impinges on the micromirror 1 of the microscope 4 and is thrown there as primary laser beam 5 onto the rear side of the lighting surface 6 having a light-conversion phosphor. Here as well, the scanning primary light beam 5 generates a light image on the lighting surface 6 which can be projected onto a roadway by means of the optics unit 7. In this figure, similarly to FIG. 2, the white light exiting from the lighting surface 6 and used to illuminate the roadway is not shown. The lighting surface 6 used in this embodiment has the property that it allows a small part of the primary laser beam 5 to pass through as secondary laser beam 10, wherein it is ensured that no risk to a human eye can be posed by this secondary laser beam 10. Alternatively, a selective filter can also be placed in front of the optics unit 7, which filter at least significantly weakens the light of the secondary laser beam 10.

FIG. 3a again shows the position of the secondary laser beam 10 in the neutral position of the micromirror 1. With deflection of the micromirror 1 into a first extreme position, as illustrated in FIG. 3b, the secondary laser beam 10 can impinge on a photosensor 9, which is arranged in this example close to one side of the optics unit 7. In the position shown in FIG. 3b, the photosensor 9 emits a signal s accordingly.

In the other extreme position of the micromirror 1, which is illustrated in FIG. 3c, the secondary laser beam 10, which has passed through the lighting surface 6, extends past the other edge of the optics unit 7 and does not impinge on the photosensor 9.

The function is comparable in principle to that of the embodiment according to FIG. 2. A synchronisation signal is obtained for the laser modulation, or no signal is obtained if the laser 2 has failed or the micromirror 1 is immobile, and unusual signals are obtained if the phosphor layer of the lighting surface 6 is damaged. In this embodiment as well, at least one further photosensor could be provided, which for example detects the second extreme position according to FIG. 3c.

In FIG. 3 a secondary laser beam 10 is shown which represents a linear extension of the primary laser beam 5 impinging on the lighting surface 6 from behind. However, the primary laser beam 5 may actually also be refracted and/or scattered, such that the profile of the secondary laser beam 10 looks differently accordingly. This naturally does not have to be taken into consideration when positioning the photosensor or the photosensors.

Lastly, a further embodiment of the invention is shown in FIG. 4, in which, as in the embodiment according to FIG. 3, the lighting surface 6 is scanned at the rear side thereof by the primary laser beam 5. In this embodiment however, in contrast to FIG. 3, A photosensor 9 is likewise arranged on the side of the lighting surface 6 facing away from the optics unit 7 in order to detect a secondary laser beam 11 reflected by the rear side of the lighting surface 6. The embodiment according to FIG. 4 thus constitutes a variant having features of the embodiment according to FIG. 2 and the embodiment according to FIG. 3, wherein the function is compatible with that according to the previous figures.

In order to increase the reliability or the redundancy of the system, a further photosensor 9' could be provided in the embodiment according to FIG. 4 at a point similarly to the embodiment according to FIG. 3 in order to detect a secondary laser beam 10 penetrating the lighting surface 6 and illustrated by a dashed line. In such a case the photosensor 9 may perform the tasks already mentioned in conjunction with FIG. 2, and the additional photosensor 9' may emit a signal especially when the phosphor of the lighting surface 6 is damaged, for example is detached therefrom. As already indicated, it is possible for the additional photosensor 9' to also be able to record diffuse laser light scattered on the lighting surface 6 on account of a fault and, to emit a corresponding signal as error signal. In the embodiment according to FIG. 4 as well, it is naturally possible to arrange a plurality of sensors both on the rear side and on the front side of the lighting surface 6.

LIST OF REFERENCE SIGNS

1 micromirror
2 laser
3 modulated laser beam
4 microscanner
5 primary laser beam
6 lighting surface
7 optics unit
8 secondary laser beam
9 photosensor
10 secondary laser beam
11 secondary laser beam
$\phi$ deflection angle

The invention claimed is:

1. A vehicle headlight comprising:
   at least one laser light source (2);
   a lighting surface (6) having a light-conversion phosphor;
   a micromirror (1) that can be pivoted about at least one axis;
   an optics unit (7); and
   at least one photosensor (9),
   wherein a laser beam (3) from the at least one laser light source (2) will be deflected onto the lighting surface (6) via the micromirror (1) pivoting in a scanning manner to generate on the lighting surface (6) a light image which can be projected onto a roadway via the optics unit (7), and
   wherein the at least one photosensor (9) is positioned with respect to the lighting surface (6) to detect a secondary laser beam (8) emitted from the lighting surface in predetermined deflection positions of the micromirror (1), which deflection positions correspond to a deflection angle ($\phi$) and is designed to emit a signal (s), which signal (s) serves as a synchronisation signal for a laser modulation.

2. The vehicle headlight of claim 1, wherein the secondary laser beam (8, 11) exiting from the lighting surface (6) is a reflected part of the primary laser beam (5).

3. The vehicle headlight of claim 1, wherein the secondary laser beam (10) exiting from the lighting surface (6) is a part of the primary laser beam (5) penetrating the lighting surface.

4. The vehicle headlight of claim 1, wherein the micromirror (1) can be pivoted about two axes and each of the two pivot ranges corresponding to the two axes is assigned at least one photosensor.

5. The vehicle headlight of claim 2, wherein at least one photosensor (9, 9') is provided for each of the reflected secondary laser beam (11) and for the secondary laser beam (10) penetrating the lighting surface.

* * * * *